United States Patent [19]

Foster et al.

[11] 3,836,389

[45] Sept. 17, 1974

[54] GLASS COATED ELECTRICAL STEEL SHEET AND ARTICLES PREPARED THEREFROM

[75] Inventors: Karl Foster; Joseph Seidel, both of Pittsburgh, Pa.

[73] Assignee: Westinghouse Electric Corporation, Pittsburgh, Pa.

[22] Filed: Mar. 22, 1972

[21] Appl. No.: 237,202

Related U.S. Application Data

[60] Continuation of Ser. No. 46,152, June 15, 1970, abandoned, which is a division of Ser. No. 576,963, Sept. 2, 1966, Pat. No. 3,528,863, which is a continuation-in-part of Ser. No. 556,337, June 9, 1966, abandoned.

[52] U.S. Cl................. 117/129, 117/70 A, 106/48, 106/54
[51] Int. Cl......... C03c 7/02, C03c 7/04, C03c 3/08
[58] Field of Search........ 106/54, 48; 117/129, 230, 117/223, 70 A; 161/192, 196

[56] References Cited

UNITED STATES PATENTS

| | | | |
|---|---|---|---|
| 2,020,467 | 11/1935 | Heinz.................................... | 106/54 |
| 2,161,824 | 6/1939 | Krefft et al. ...................... | 106/54 X |
| 2,414,633 | 1/1947 | Bryant.................................. | 158/48 |
| 3,110,399 | 11/1963 | Godrow............................ | 106/54 X |
| 3,454,433 | 7/1969 | Mueller............................. | 106/48 X |

Primary Examiner—Winston A. Douglas
Assistant Examiner—Mark Bell
Attorney, Agent, or Firm—R. T. Randig

[57] ABSTRACT

An oriented silicon steel product and method for producing the same is described in which improved magnetostriction and strain sensitivity are obtained by means of bonding a thin glass layer to the surface of the steel.

2 Claims, 4 Drawing Figures

PATENTED SEP 17 1974  3,836,389

WITNESSES
W. M. Farbas
James F. Young

INVENTORS
Karl Foster and
Joseph Seidel
BY
Robert V. Randig
ATTORNEY

GLASS COATED ELECTRICAL STEEL SHEET AND ARTICLES PREPARED THEREFROM

CROSS-REFERENCE TO RELATED APPLICATION

The present application is a continuation of application Ser. No. 46,152 filed June 15, 1970, now abandoned, which in turn was a division of application Ser. No. 576,963 filed Sept. 2, 1966, now U.S. Pat. No. 3,528,863 which issued Sept. 15, 1970, which in turn was a continuation-in-part of application Ser. No. 556,337 filed June 9, 1966, now abandoned.

This invention is directed to a process for producing oriented magnetic sheet having an inorganic vitreous coating thereon for reducing magnetostriction wherein the magnetic sheet to be coated has an intermediate coating of complex magnesium-base compounds thereon; to the coated magnetic sheet made by the process; to articles such as cores made by bonding the coated magnetic sheet; and to the special glass compositions used in the process.

The electrical steel with which this invention is concerned is an iron-silicon alloy containing up to 6% silicon, by weight, and most commonly about 3% silicon. Electrical steels of this composition when appropriately treated will assume preferred grain orientation or textures. One oriented electrical steel sheet of this type has a so-called "cube-on-edge" grain orientation, or as it is more conventionally identified in terms of Miller indices, the (110) [001] grain texture, and has attained great commercial importance. The single oriented magnetic sheets of this type and magnetic cores made from these sheets are often sold under the trademark Hipersil.

Another oriented electrical steel sheet contains essentially the same amount of silicon and has a "cube-on-face" grain texture or "double" grain orientation, or, in Miller indices, a (100)[001] texture. This double oriented material has also been produced in commercial quantities and oriented magnetic sheets of this type and magnetic cores made from them are sold under the trademark Cubex.

A typical composition of the above-mentioned oriented electrical steel sheets is; 3.15% silicon, about 0.1% manganese less than 0.005% each of carbon oxygen and sulfur and the balance essentially iron.

Transformers have laminations made from these silicon-iron "single" and "double" oriented steels perform very satisfactorily in most instances. However, transformers of this type do produce a substantial amount of noise during operation, as the result of the phenomenon known as magnetostriction. Many materials when magnetized or demagnetized undergo changes in dimension, the effect called magnetostriction, which is defined as:

$$\Delta L/L$$

or the change in length per unit length in the direction of magnetization under the magnetizing force applied, the ratio increasing with increasing induction. The symbol $\lambda$ is commonly employed to represent this dimensional ratio. It is obvious that the reduction of audible noise produced by transformers is a goal of high desirability, in view of the ever-increasing trend toward locating power sub-stations close to densely populated areas, in office and apartment buildings and in shop areas.

While, with the improvement in magnetic materials already achieved with respect to core loss and permeability, it is quite feasible to operate transformers at higher inductions than have been utilized in the past, a limitation is imposed by the noise generated by the transformers. Since the magnitude of the magnetostrictive effect, and the noise produced thereby, increases with the induction, in many cases it has been necessary to operate transformers at a level below the maximum induction at which they are capable of operating at a substantial economic sacrifice.

The magnetostrictive effect discussed above is extremely important in transformers of large size, transformers which are of the stacked lamination type. In making transformers of this type a magnetic sheet is stamped to the proper size and shape and the flat sheets are then stacked to achieve a transformer core of the desired size.

In certain smaller cores of the wound-cut type also known as "C-cores" (the two halves of a cut core being C-shaped), the problem of noise does not loom so large, but other problems do exist in this area because the presently employed organic bonded C-cores are characterized by relatively high core loss and, of course, are restricted to relatively low service temperatures, of perhaps 200° or 250°C., above which the resins presently used tend to deteriorate, with the result that the core delaminates and may become substantially inoperative. The manufacture of such organically bonded cores is a rather complex process requiring a plurality of steps which must be carefully carried out to obtain a satisfactory product.

Typically, the process for making organically bonded magnetic cores involves coating a magnetic strip material with an inorganic electrical insulator such as magnesium phosphate, winding the coated magnetic strip to core configuration, annealing the wound core to remove stresses introduced in the winding process, impregnating the core with a bonding resin in a vacuum environment to obtain penetration of the resin between adjacent laminations, and oven curing the resin impregnated core to harden the resin and thereby bonded into an integral structure. After the curing procedure the core is cut so that performed coils may be conveniently placed about the core. A less complex process would thus clearly be highly desirable.

It is therefore, an object of the present invention to reduce the noise level due to magnetostrictive effects in induction apparatus such as transformers by employing sheets of electrical steel having a composite coating thereon which maintains the steel sheet in tension thereby reducing magnetostriction and strain sensitivity.

It is a further object of the invention to provide for use as coatings on magnetic steel sheet, glass compositions having coefficients of thermal expansion substantially less than that of the steel sheet and capable of flowing to coat the steel sheet in a temperature range in which the stress relief of the steel sheet can be concurrently accomplished, whereby on cooling the steel sheet is held in tension by the glass coating.

It is still another object of this invention to provide a process for making oriented electrical steel sheets having extremely low magnetostriction which includes providing a composite coating on the steel sheets wherein a thin, highly adherent glass coating is bonded to the steel sheet through an intermediate layer of complex magnesium-base compounds.

Another object of this invention is to provide a glass coated oriented electrical steel sheet wherein the glass coating maintains the steel sheet in tension to thereby reduce magnetostrictive effects and wherein the glass coating is bonded to the steel sheet through an intermediate layer of complex magnesium-base-compounds.

It is another object of this invention to provide a glass bonded core structure comprising a plurality of electrical steel sheets each having thereon an intermediate layer of complex magnesium-base compounds, the glass being bonded to adjacent steel sheets through the said intermediate layer and forming an insulating layer between adjacent steel sheets.

Another object of the invention is to provide a bounded wound and cut magnetic core wherein adjacent turns of the core are bonded to each other by a thin, highly adherent layer of glass disposed between the turns, the glass being bonded to the steel sheet through an intermediate layer of complex magnesium-base compounds; the glass providing insulation between the said adjacent turns and bonding the structure into an integral whole.

Other objects of the invention, will, in part, be obvious and will, in part, appear hereinafter.

For a better understanding of the nature and objects of the invention, reference should be had to the following detailed description and to the drawings, in which.

It has been found that extremely low magnetostriction, and hence a low noise level, may be obtained in electrical steel sheets of oriented iron-silicon alloys having thereon a coating of complex magnesium-containing compounds by providing on this coating an overlying adherent thin coating of glass having a low coefficient of thermal expansion relative to the steel sheet so that the sheet is maintained in tension after the composite sheet has cooled to room temperature. It has been demonstrated that core losses are substantially reduced in the composite sheet of this invention. Single oriented materials in most cases have a coating of complex magnesium containing compounds as a result of the manufacturing process, and such a coating can be provided on double oriented materials as required.

Figure 1:
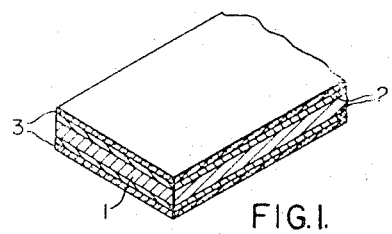
FIG. 1 is a fragmentary enlarged cross-sectional view of a composite steel sheet of this invention.

In FIG. 1, there is shown an enlarged cross-section of a glass coated electrical sheet of this invention in which the various layers can be seen. The oriented magnetic steel sheet 1 has on its surface a "mill coating" 2 of complex magnesium base compounds which usually is the product of the reaction of MgO, applied as an aqueous suspension of magnesia or magnesium hydroxide, with the iron-silicon sheet at an elevated temperature. The complex mill coating contains as its principal components MgO, FeO and $SiO_2$. The steel sheet is commonly supplied in commerce with this adherent mill coating present thereon. This intermediate coating 2 may in some cases include a magnesium phosphate coating superimposed on and reacted with the mill coating. Aluminum phosphate coatings also may be applied to the steel sheet as for instance, $Al_2O_3 \cdot 3P_2O_5$, with or without small amounts of silica and iron oxide. These comprise phosphoric acid and hydrated alumina. In other cases, this intermediate coating may be the reaction product of magnesium phosphate alone with the bare steel sheet. The glass coating 3 is the outermost coating on the steel sheet and is well bonded to the intermediate coating 2. The glasses used for the coating 3 in carrying out the invention will bond tenaciously to the coating 2, and have a low thermal coefficient of expansion relative to that of the steel sheet, and therefore, on cooling from annealing temperatures, contract less than the steel sheet and thereby hold the steel sheet in tension. In appearance, the coated steel is a uniform grey and the coating 3 is both very smooth and extremely thin so that a good space factor is obtained. The coated sheet is quite flexible and the coating does not crack in bending at least until the elastic limit of the steel is exceeded. It is thus seen that the oriented steel sheet 1 has a glass coating on both sides thereof which is effective to place the steel sheet in tension.

A suitable glass for the practice of one aspect of the invention is one that has a coefficient of expansion of not over $8.5 \times 10^{-6}$ /°C and preferably below $5 \times 10^{-6}$/°C, which fuses and coats steel at a firing temperature of below 925°C and above about 700°C, is a good electrical insulator in thin coatings of the order of 0.1 mil, and is stable when exposed to the atmosphere and liquid dielectrics such as petroleum oil. It should be noted that the iron-silicon alloy to which the glass is applied will have a coefficient of thermal expansion of about $13 \times 10^{-6}$/°C at about 800°C.

As one example of the glass coating 3, a family of zinc oxide glasses which is found to be satisfactory and forms a part of this invention, has the composition:

| Constituent | Weight Percent |
| --- | --- |
| ZnO | 31–60 |
| $B_2O_3$ | 11–22 |
| PbO | 10–44 |
| $SiO_2$ | 8–14 |

The glasses of this composition have coefficients of thermal expansion which are generally less than $5 \times 10^{-6}$/°C.

Within the broad range set forth above, a preferred composition has the composition:

| Constituent | Weight Percent (Approximate) |
| --- | --- |
| ZnO | 60 |
| $B_2O_3$ | 20 |
| PbO | 12 |
| $SiO_2$ | 8 |

Another example is a family of phosphate glasses suitable for the practice of this invention, comprising from 60 to 70% by weight of $P_2O_5$, from 10 to 14% by weight of MnO, from 9 to 12% by weight $Al_2O_3$, a total of at least 5% by weight of one or more constituents from the group consisting of:

| Constituent | Weight Percent |
| --- | --- |
| ZnO | 0–8 |
| SiO$_2$ | 0–10 |
| Na$_2$O | 0–3 |
| CaO | 0–7 |
| MgO | 0–4 |
| BaO | 0–5 | and with optional additions of up to 1% by weight of As$_2$O$_3$ up to 1% by weight of V$_2$O$_5$, up to 5% by weight of B$_2$O$_3$, and up to 5% by weight of Fe$_2$O$_3$.

A somewhat narrower range of phosphate glasses within the scope of this invention, having coefficients of thermal expansion generally less than $8 \times 10^{-6}/°C$, has the composition:

| Constituent | Weight Percent |
| --- | --- |
| P$_2$O$_5$ | 60–70 |
| MnO | 10–14 |
| Al$_2$O$_3$ | 9–12 |
| ZnO | 4–7 |
| SiO$_2$ | 1.5–3.5 |
| Na$_2$O | 0–2 |
| CaO | 0–1 |
| As$_2$O$_3$ | 0–1 |
| V$_2$O$_5$ | 0–1 |

Within the range of this restricted family of glasses a preferred glass has the composition:

| Constituent | Weight Percent (Approximate) |
| --- | --- |
| P$_2$O$_5$ | 66 |
| MnO | 12 |
| Al$_2$O$_3$ | 10.50 |
| ZnO | 5.50 |
| SiO$_2$ | 2.75 |
| Na$_2$O | 1.50 |
| CaO | 0.75 |
| As$_2$O$_3$ | 0.5 |
| V$_2$O$_5$ | 0.5 |

As a further example, a family of silicate glasses has been found to be particularly satisfactory for bonding wound and cut cores has the composition:

| Constituent | Weight Percent |
| --- | --- |
| SiO$_2$ | 45–55 |
| B$_2$O$_3$ | 10–14 |
| Al$_2$O$_3$ | 5–7 |
| Na$_2$O | 8–15 |
| BaO | 10–16 |
| CaO | 5–8 |
| P$_2$O$_5$ | up to 4 |
| MoO$_3$ | up to 2 |

Within the above range of silicate glasses a preferred glass has the composition:

| Constituent | Weight Percent (Approximate) |
| --- | --- |
| SiO$_2$ | 50 |
| B$_2$O$_3$ | 12 |
| Al$_2$O$_3$ | 6 |
| Na$_2$O | 11 |
| BaO | 15 |
| CaO | 6 |

It will be understood that the above glass compositions represent the calculated oxide content based on the raw materials employed to form the glass and that the amounts given do not take into account losses of certain constituents such as PbO and B$_2$O$_3$, for example, which may be volatilized to some extent during the fusing process, or pickup of small amounts of other constituents from the crucible during melting, such as Al$_2$O$_3$. Therefore, the compositions given above do not necessarily represent the precise glass analysis subsequent to fusing, although closely approximating such analysis.

Other glasses having the properties required may be employed in practicing the invention.

Broadly, in practicing the invention, sheet magnetic steel having an adherent magnesium base "mill" coating thereon is provided with a thin coating of the order of 0.1 mil of a glass having a coefficient of thermal expansion less than that of the steel and is heated to a temperature in the range of from 700°C to 925°C so that the applied glass fuses and bonds to the magnesium base coating as the steel and the magnetic sheet is simultaneously stress relieved, and on cooling the magnetic sheet is put in tension by the applied thin fused glass coating. The glass coated magnetic sheet steel can be cut, if not already cut, into laminations and stacked into a core. The glass coated steel can be wound into a spiral form and placed in a furnace and heated to the softening point of the glass so as to bond the core turns into a solid core body. The bonded spiral wound core can be cut into two C-shaped core portions to enable windings to be placed thereon and reassembled into a spiral core.

In practicing the process of the invention, as the glass is applied to coils of steel sheet having the (110) [001] or (100) [001] grain texture (or other desired grain texture) with a coating of complex magnesium-containing compounds thereon, the preferred steps are: (a) scrubbing the sheet surface to remove any loose or non-adherent particles of the coating of complex magnesium-containing compounds if required, (b) thermal flattening, (c) dipping or otherwise providing the steel sheet with a coating of glass slip composed of the finely divided glass frit of the required properties suspended in a liquid such as water or alcohol and (d) firing at a temperature of from 700°C to 850°C, or preferably, from 725°C to 780°C, to fuse the glass while stress relieving the steel sheet.

The above glass formulations employed have a low coefficient of thermal expansion relative to the silicon steel, and therefore, on cooling, the glass contracts less than the steel sheet and thereby places the steel sheet in tension which drastically reduces the magnetostriction and further reduces the strain sensitivity of the sheet.

The flattening step for coil sheet of the above process involves pulling the sheet steel to provide a tension of about 700 psi at a temperature, for example, of 815°C. Where the steel sheet is not in coil form, but rather in the form of flat sheets, the flattening step of the process outlined above will not be necessary. Also, if the steel sheet is to be used in wound cores, the sheet is not thermally flattened. Further, the scrubbing step (which is intended to encompass any means for removing loose particles of the intermediate layer), may not be necessary in all cases, for sometimes the amount of loose particles is insignificantly small.

Figure 2:
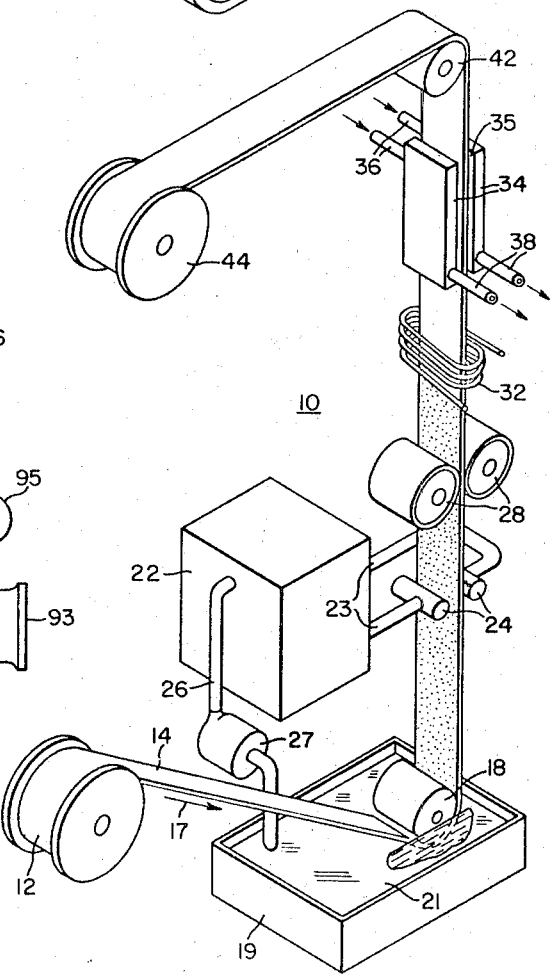
FIG. 2 is a schematic drawing of an annealing line including means for coating a steel sheet with glass and firing the same.

FIG. 2 shows annealing line 10 in which steps (c) and (d) of the above process for treating a coil of electrical steel may be practiced. More particularly, the figure shows a coil 12 of magnetic alloy sheet 13 comprising, for example, silicon iron, having a mill coating or other complex magnesium base compounds thereon. The coil 12 rotates in a clockwise direction and the magnetic sheet 14 is drawn in the direction indicated by the arrow 17 and passes around dip roll 18 which immerses the strip in a glass slip 21 contained in a coating tank 19. The dip roll also is employed to change the direction of the sheet to a line of travel vertically upward. As the sheet moves upwardly from the coating tank 19, it passes between spray heads 24 which are connected to reservoir 22 by conduits 23. The reservoir 22 holds a supply of glass slip which may be continuously replenished from coating tank 19 by pump 27 through the conduit 26. The spray heads 24 completely cover both sides of the steel sheet with a thin uniform coating of the glass slip. While in the line shown in FIG. 2, two coating means are employed, i.e., coating tank and spray heads, in some cases only one of these means is required.

The steel sheet in its path vertically upward from the spray heads 24 passes between wiping rolls 28 which assure that the steel sheet has a thin, even coating of glass slip on both sides thereof. The excess glass slip, of course, flows down the sheet 14 and back into the coating tank 19. The wiping rolls 28 also are the means by which tension is maintained on the sheet 14 during the passage through the annealing line. The sheet, continuing its vertical upward movement above the wiping rolls passes through, essentially axially thereof, an induction coil 32 which raises the temperature of the alloy sheet to a critical annealing temperature relatively quickly in a short distance of travel. In the same temperature range, the glass is heated to its firing temperature. The firing temperature is the temperature at which the glass will flow and coat the substrate within the time period available for the coating operation.

The sheet continues its upward movement through a narrow dead air chamber 35 which is formed by a pair of flat radiant cooling plates 34 which may be liquid or vapor cooled. In the annealing line shown in the figure, a pair of water inlets 36 and a pair of water outlets 38 are provided so that cold water may be circulated through the cooling plates to maintain the plates at the desired low temperature. In its passage through the chamber 35, the glass coated steel is cooled with great uniformity to a temperature below 400°C.

After cooling, the sheet continues its upward movement to an idler roll 42 about which the sheet is turned 90° to a horizontal direction of movement for coiling about the reel 44 which is rotated in a counterclockwise direction by a suitable drive or motor (not shown).

In some cases where high rates of sheet travel are employed, it may be desirable to provide additional cooling of the sheet by turning the sheet to a vertically downward line of travel about the upper idler roll 42. The downward vertical line of travel would carry the sheet through a second cooling chamber provided with means for directing an air blast on the glass coated magnetic sheet. Additional cooling chambers may be employed as required to reduce the temperature of the sheets sufficiently to facilitate subsequent handling thereof.

In industrial operation, the reel 12 rotates while under a brake control to allow the sheet 14 to uncoil and pass into the annealing line, while the driven wiping rolls 28 and the power applied to reel 44 determine the tension on the sheet. It may be desirable to provide preliminary heating of the surface of the sheet as by infrared heaters prior to entering the region of the induction coil to evaporate the fluid medium in which the glass slip is suspended. However, if this is not done, the fluid medium will rapidly evaporate in the induction coil itself.

The induction coil 32 raises the temperature of the sheet in a narrow band by means of longitudinal flux induction heating. The sheet, as it travels through the induction coils, reaches red heat only momentarily. This is strikingly visibly apparent, for a straight narrow high temperature red band is visible transverse of the sheet and extends from edge to edge.

The handling and guiding of the moving sheet is aided by the use of longitudinal flux from the encircling induction coil because the sheet automatically tends to take up a central position within the coil rather than being attracted to the inductor pole faces, as would be the case if a transverse flux induction coil arrangement had been employed.

While the above discussion has been limited to a vertical induction heating line which has certain advantages, it will be understood that horizontal coating and annealing lines may be used as well and that radiant electric or gas heating may be employed instead of the induction heating means shown.

The improved glass coatings of this invention are not only capable of lowering the magnetostriction but are particularly adapted to be applied over MgO or magnesium phosphate coatings or both on commercially produced single oriented electrical steel. That portion of the coating which is termed "mill coating" is an integral part of the present commercial process of obtaining a single oriented material. The magnesium phosphate, or "Carlite" coating as it is sometimes called, is often superimposed on the mill coating to increase electrical insulation. It has been found that the glass coatings when superimposed on the mill coating or on the Carlite coating, results in no degradation and sometimes even effect an improvement in the electrical loss characteristics of the electrical steel. Certain of the glasses within the scope of the invention can be applied at the relatively low temperature of about 700° to 850°C, and preferably, from 725°C to 780°C, to a range of temperature which is in the stress relief range for the electrical steel sheet. The glass coatings substantially decrease the strain sensitivity of both the magnetic properties and the magnetostriction of the single oriented materials.

Further, the glass coatings of this invention are effective when applied in thicknesses on the order of only about 0.1 tenth to 0.3 mil on each side of the sheet, a matter which is of importance since the space factor must be taken into consideration in the design of transformers. The space factor is the ratio of the equivalent "solid" volume, calculated from the weight and density of the steel, to the actual volume of the compressed stack of steel sheets in an electrical steel core, determined from its dimensions. Space factors greater than 94% can be obtained with the thin glass coatings of this invention, and such high space factor values are eminently suitable for present transformer designs.

In the preparation of glass coatings compositions, the components of the glass composition are first melted; then the glass is fritted and ball milled in a fluid medium to form a fine slurry. The glass may alternatively, be dry ground and then added to the fluid medium. The fluid medium employed may be ethyl alcohol, propyl alcohol, or an aqueous glycol solution (ethylene glycol for instance) in some cases, but generally it will be water. Water is the preferred fluid medium for commercial operation, since it is far cheaper and safer than any other fluid medium which would be employed.

The composition and physical properties of three representative glasses are given in the following table:

TABLE I

Composition and Properties of Glass Coatings

| | M305 | PH115 | LX101 |
|---|---|---|---|
| $SiO_2$ (wt. %) | 50.00 | 2.75 | 8.00 |
| $B_2O_3$ (wt. %) | 12.00 | — | 20.00 |
| $P_2O_5$ (wt. %) | — | 66.00 | — |
| $Al_2O_3$ (wt. %) | 6.00 | 10.50 | — |
| $Na_2O$ (wt. %) | 10.00 | 1.50 | — |
| $CaO$ (wt. %) | 6.00 | 0.75 | — |
| $BaO$ (wt. %) | 15.00 | — | — |
| $ZnO$ (wt. %) | — | 5.50 | 60.00 |
| $PbO$ (wt. %) | — | — | 12.00 |
| $MnO$ (wt. %) | — | 12.00 | — |
| $MoO_3$ (wt. %) | 1.00 | — | — |
| $As_2O_3$ (wt. %) | — | 0.50 | — |
| $V_2O_5$ (wt. %) | — | 0.50 | — |
| Coef. of Thermal Expansion, $\times 10^{-6}/°C$ | 8.2 | 7.2 | 4.6 |
| Deformation Temp., °C | 620 | 490 | ~400 |
| Firing Temp., °C | 925 | 760 | 760 |

Glass M-305 of the above table requires, as will be seen, a firing temperature in air of slightly above 900°C and has a high coefficient of expansion. Although it is possible to modify the glasses in this system to obtain lower thermal expansion values, still higher firing temperatures would normally result. High firing temperatures i.e., above 925°C, in air tend to degrade the properties of the coated steel as to electrical losses. Glass PH115 of the above table is a phosphate base glass and can be fired between 750° and 800°C and its coefficient of thermal expansion is somewhat lower than glass M-305. Glass LX101, which has an extremely low thermal expansion value, is a zinc oxide base glass which can also be fired in the 750° to 800°C range. The silica content of this latter glass is maintained at a low level to assure a relatively low firing temperature.

In making glass LX101 in accordance with this invention having the composition:

| Constituent | Weight Percent (Nominal) |
|---|---|
| ZnO | 60 |
| $B_2O_3$ | 20 |
| PbO | 12 |
| $SiO_2$ | 8 |

The following raw materials are weighed out in the following weight proportions:

| ZnO | 60 |
|---|---|
| $H_3BO_3$ | 35.5 |
| $Pb SiO_3$ | 14.1 |
| $SiO_2$ | 5.8 |

The dry powdered raw materials are mixed thoroughly in a powder blender for several minutes and then poured into a crucible, which is preheated to about 2,100°F. The crucible is suitably made of a ceramic material called "Kyanite" which contains both $Al_2O_3$ and $SiO_2$. The crucible is placed in a furnace at about 2,100°F and the contents thereof are fused. The molten glass is stirred occasionally during the process to remove bubbles and after complete fusion the glass is "fined" which means that the molten glass is permitted to stand in the furnace at temperature with occasional stirring to further reduce the amount of bubbles. Thereafter, the glass is poured into water or between water cooled rolls which produces a glass frit. In the case where the glass is poured into water, the frit is in the form of fine beads and in the case where the glass is poured between water cooled rolls the glass frit is in the form of flakes. Thereafter the frit is dried and then introduced into a ball mill with a suspending agent which may be water or alcohol such as ethylene or ethyl alcohol. The frit is ground for a period of time sufficient to produce the desired powder size; for example, a size in which 95% passes through a 325 mesh screen and 100% passes through a 100 mesh screen. When the desired particle size has been achieved, the slip suspension is discharged from the ball mill and applied to the electrical steel sheet.

In making the phosphate glass PH115 the following raw materials were used in the weight proportion list below:

| $NH_4H_2PO_4$ | 65.00 |
|---|---|
| $Mn_3PO_4 \cdot 7H_2O$ | 27.10 |
| $Al PO_4$ | 25.10 |
| ZnO | 5.50 |
| $SiO_2$ | 2.75 |
| $Na PO_3$ | 4.93 |
| $Ca CO_3$ | 1.34 |
| $As_2O_3$ | .50 |
| $V_2O_5$ | .50 |

The steps employed in making a slip of glass PH115 are identical to the steps prescribed with respect to glass LX101.

The uncoated single oriented material has a very high positive λ value in the rolling direction. Most single oriented material in the 10 to 14 mil thickness range is produced with an MgO mill coating. This coating results in a substantial decrease in λ over bare single oriented material; however, the decrease is somewhat erratic and the material is still very strain sensitive. We have found that the glasses of this invention can be applied directly to the mill coating, resulting in consistently low λ values and decreased strain sensitivity.

One process for coating a coil of the single oriented "mill coated" material is as follows: (a) scrub the surfaces of the sheet to remove non-adherent mill coating as required, (b) thermally flatten the annealed coil, (c) apply glass slip and dry, (d) fire at 700° to 850°C in air. In the thermal flattening step, a stack of sheets sheared from the coil is placed in a furnace at a temperature of 1,050°C for 3 hours. Employing the procedure thus outlined, oriented steel sheets were glass coated and the losses and magnetostriction of the sheets were compared with the same properties of bare steel sheets and sheets having a mill coating thereon, as set forth in the following example:

EXAMPLE I

The following results were obtained in the rolling direction of flattened 11 mil thick single oriented material. Glass coatings having thicknesses of 0.2 to 0.3 mils per sheet side were used.

TABLE II

| Coating | Pc 15/60 (w/No.) | Pc 17/60 (w/No.) | $\lambda$ ($\times 10^{-6}$) 15KG | 17.5KG | 20KG |
|---|---|---|---|---|---|
| Bare | — | — | 10.9 | 15.8 | 20.5 |
| Mill Coat | .49 | .71 | 0.8 | 2.0 | 5.6 |
| Glass M-305 | .50 | .72 | −1.0 | −1.6 | −0.3 |
| Glass PH115 | .49 | .70 | −0.8 | −1.5 | −0.1 |
| Glass LX101 | .48 | .69 | −1.0 | −1.5 | −1.0 |

In the above Table II, the results obtained with the glass coated sheet are compared with both bare sheet and mill coated sheet. Pc is the watts loss per pound of the magnetic core at the given induction at the given cycles; 15/60 meaning 15,000 gauss at 60 cycles. KG is kilogauss. The results in this case indicate that the mill coated material has fairly low $\lambda$ compared to bare material, however, in other tests, as set forth in Table V below, the $\lambda$ values obtained on mill coated material were considerably higher. Glass M-305 increased losses slightly, while glasses PH115 and LX101 were about the same as mill coated material or somewhat lower in loss. All three glasses resulted in consistent low negative $\lambda$ values.

The strain sensitivity of mill coated single oriented material and the effect of the glass coatings thereon is illustrated by the following results obtained by test samples with the residual radius of curvature, resulting in bending stresses:

TABLE III

| Coating | Radius of Curvature (Inches) | Pc 15/60 (w/No.) | Pc 17/60 (w/No.) | $\lambda$ ($\times 10^6$) 15KG | 17.5KG | 20KG |
|---|---|---|---|---|---|---|
| Mill Coat | flat | .49 | .71 | 0.8 | 2.0 | 5.6 |
| Mill Coat | 72 | .52 | .77 | 5.3 | 9.1 | 12.8 |
| Mill Coat | 48 | .58 | .82 | 7.2 | 12.1 | 17.1 |
| Glass M305 | 48 | .51 | .76 | 1.4 | 4.3 | 7.7 |
| Glass PH115 | 72 | .51 | .73 | −1.1 | −2.0 | 0.2 |
| Glass PH115 | 48 | .52 | .74 | 1.2 | 3.8 | 7.7 |

The results show that the sheet is quite sensitive to bending stresses caused by only very small amounts of curvature in that such stresses substantially increase losses and magnetostriction of mill coated single oriented material. The glasses on the other hand, greatly decrease $\lambda$ of the bent samples and even reduce losses, an effect not previously observed. Comparing the losses (Pc 15/60) at a radius of curvature of 48 inches with mill coated flat sheet, the mill coated sheet with bending stresses showed at 18% increase in losses, while the glass (PH115) coated sheet showed only a 6% increase in losses.

A thin gauge single oriented material (2 to 6 mils) is normally commercially produced bare and is thereafter coated with a magnesium phosphate coating which is fired at about 750°C. This magnesium phosphate coating is added to insulate the laminations from each other when the magnetic sheets are made up into transformers. We have found that our glasses have good adherence to this coating, resulting in improved losses and reduced $\lambda$ as illustrated by the following results on 4 mil single oriented material measured in the rolling direction. In Table IV, below, the glass coated material is compared with the magnesium phosphate coated material.

TABLE IV

| Coating | Pc 15/100 (w/No.) | Pc 17/400 (w/No.) | $\lambda$ (x $\times 10^{-6}$) 15KG | 17.5KG | 20KG |
|---|---|---|---|---|---|
| Magnesium-phosphate | 6.37 | 9.35 | 14.7 | 19.8 | 25.3 |
| Glass PH115 | 4.82 | 7.35 | 0.3 | 1.3 | 4.6 |

As will be noted from the above table, the thin single oriented material with a magnesium phosphate coating thereon had a very high $\lambda$. The glass coating reduced the losses substantially, far below the commonly noted loss levels in this material, and greatly decreased $\lambda$.

EXAMPLE II

Samples of single oriented electrical steel sheet were coated with (1) phosphate glass in water, and (2) zinc oxide glass in alcohol. The sheet was provided with coatings of the glasses which were rolled on and wiped to obtain an even coating and thereafter fired. The results in respect to magnetostriction obtained on each of the glass-coated sheets is compared with steel sheet having a mill coating (reaction products of MgO) and a magnesium phosphate coating superimposed on the mill coating. The following results were obtained:

TABLE V

| Glass Coating | $\lambda$ ($\times 10^{-6}$)* 15KG | 17.5KG | 20KG |
|---|---|---|---|
| None | 4.0 | 6.5 | 10.8 |
| Phosphate | 0.3 | 1.7 | 5.2 |
| Zinc Oxide | 0.4 | 1.6 | 5.2 |

*Average of two samples

The above results clearly indicate that the glass coatings have substantially lowered the magnetostriction of the silicon steel. It must be observed in considering Table V that while the mill coated electrical steel sheet with no additional glass coating has a somewhat higher range of magnetostriction values in the tests than is usually experienced in this material, however, from a comparative standpoint the glass coatings have clearly effected a remarkable improvement in reducing the magnetostriction.

The glass coating technique of this invention has been practiced on commercially produced single oriented coils of electrical sheet steel.

Portions of an additional single oriented coil were roll coated with glasses in an annealing line similar to that shown in FIG. 2. The samples were all annealed with a 48 inch radius of curvature therein, then flattened and tested.

TABLE VI

Test On Commercial Coil-Single Oriented Material

| Glass | Mesh | Total Coating Thickness (mils) | Bend | Anneal | Hc (oersteds) | Br (gauss) | $B_{10}$ (gauss) | Pc 15/60 w/lb | Pc 17/60 w/lb | $\lambda\ (\times 10^6)$ 15KG | 17.5KG |
|---|---|---|---|---|---|---|---|---|---|---|---|
| None | | | None | None | .139 | 10300 | 18200 | .72 | 1.01 | 11.7 | 15.1 |
| None | | Mill coating | None | Fired - no glass | .115 | 13300 | 18500 | .63 | .91 | 12.4 | 17.0 |
| None | | | None | 3 hr. 1050°C. | .091 | 15900 | 18800 | .51 | .75 | −0.5 | −0.8 |
| LX 101[a] | 400 | .36 | None | fired | .098 | 11700 | 18500 | .52 | .76 | −0.4 | −0.5 |
| LXF 101[a] | 60 | .28 | None | fired | .097 | 13300 | 18700 | .52 | .74 | −0.4 | −0.2 |
| LXF 101[a] | 100 | .36 | None | fired | .098 | 13100 | 18500 | .52 | .75 | −0.4 | −0.5 |
| LXF 101[a] | 200 | .36 | None | fired | .096 | 12600 | 18700 | .52 | .75 | −0.4 | −0.6 |
| LXF 101A[b] | 100 | .34 | None | fired | .096 | 1330 | 18700 | .53 | .76 | −0.3 | 0.1 |

[a]Roller coated - zinc oxide glass
[b]Propylene glycol suspension of zinc oxide glass

EXAMPLE III

A portion of a mill coated coil of a single oriented steel sheet was coated with a zinc oxide glass slip and fired to coat the steel and to anneal the steel sheet. The results obtained on the glass coated steel sheet are compared in the following table with steel sheet from the same coil which had on it only a mill coating.

It will be noted from the above table that a marked improvement in the magnetostriction is noted in all samples which were glass coated. Comparing the losses (Pc 15/60) at a radius of curvature that the mill coated sheet suffered a 12% increase in losses while the losses of the glass coated sheet increase only 8%.

The LXF101 glass was analyzed after the raw constituents were melted down with the following results:

TABLE VII

Effect of Glass Coating on Sheet Annealed With Bend

| Glass | Mesh | Total Thickness (mils) | Bend | Hc (oersteds) | Br (gauss) | $B_{10}$ (gauss) | Pc15/60 w/lb | Pc17/60 w/lb | 80 ($\times 10^6$) 15 KG | 17.5 KG |
|---|---|---|---|---|---|---|---|---|---|---|
| None | | | None | .089 | 15700 | 18400 | .49 | .72 | −0.1 | −0.3 |
| None | | | 48" radius | .098 | 13000 | 18600 | .55 | .77 | 6.1 | 10.0 |
| Zinc Oxide[a] | 400 | .2 | 48" radius | .095 | 11500 | 18600 | .54 | .79 | 1.5 | 4.4 |
| Zinc Oxide[a] | 60 | .26 | 48" radius | .094 | 12600 | 18800 | .50 | .73 | 0.6 | 2.5 |
| Zinc Oxide[a] | 100 | .28 | 48" radius | .096 | 11900 | 18600 | .53 | .75 | 3.6 | 7.7 |
| Zinc Oxide[a] | 200 | .30 | 48" radius | .095 | 11700 | 18700 | .53 | .76 | 0.9 | 2.6 |
| Zinc Oxide[c] | 100 | .40 | 48" radius | .097 | 11300 | 18600 | .53 | .75 | 1.7 | 4.6 |

[a]Dip coated
[c]Propylene glycol addition

The glass particle size was varied in the samples of Table VI without any apparent effect on the results.

It should be noted from the above table that the losses are substantially reduced solely by the application of the glass. Of course, the magnetostriction has been reduced from high positive values to small negative values.

The LX101 glass used in the above tests was chemically analyzed with the following results.

| | |
|---|---|
| ZnO | 57.64 |
| $B_2O_3$ | 19.32 |
| PbO | 11.85 |
| $SiO_2$ | 9.24 |
| Bal. $Al_2O_3$ and other impurities. | |

The coefficient of thermal expansion of the glass was measured and found to be $4.6 \times 10^{-6}/°C$.

| | |
|---|---|
| $SiO_2$ | 8.38 |
| $B_2O_3$ | 19.69 |
| PbO | 12.62 |
| ZnO | 57.92 |
| Bal. principally $Al_2O_3$ | |

Double oriented material, as normally produced, is bare and does not have a "mill coating" thereon. Therefore, to enjoy the benefits of this invention an intermediate coating is provided on the double oriented material for the purpose of securing good adherence of the glasses to the steel substrate. One method which has been successfully practiced is to produce a pseudo mill coating of complex magnesium-base compounds by annealing the steel at 1200°C in contact with MgO. The following Table VIII sets forth the results which were obtained using the pseudo mill coating just described on 12 mil double oriented siliconiron measured in the rolling direction:

TABLE VIII

| Coating | Pc 15/60 | Pc 17/60 | $\lambda$ ($\times 10^{-8}$) 15KG | 17.5KG | 20KG |
|---|---|---|---|---|---|
| Bare | .82 | 1.13 | 13.5 | 17.2 | 20.8 |
| MgO | .81 | 1.21 | 12.3 | 20.3 | 21.9 |
| Glass M305 | 1.05 | — | — | — | — |
| Glass PH115 | .82 | 1.28 | 3.3 | 5.9 | 7.5 |
| Glass LX101 | — | — | 2.3 | 3.2 | 4.7 |

The above results shows that the MgO coating alone did not substantially change the $\lambda$ of the double oriented material. Because of its high firing temperature of over 925°C, glass M305 greatly increased the losses for this test on the double oriented steel; glass PH115 did not change the losses significantly, but did results in the substantial decrease in $\lambda$. Glass LX101 also substantially reduced $\lambda$. The glass coatings reduced in $\lambda$ of the double oriented material in the cross direction an equivalent amount.

The magnesium phosphate system can also be used as a base for the application of glass coatings to the bare double oriented silicon steel sheet material. A process suitable for coating double oriented sheet material is: (a) coat with magnesium phosphate and react at a temperature of from 650° to 850°C for a period of from one-half to 30 minutes (b) thermally flatten the sheets at from 750°C to 850°C, (c) coat with glass slip, fire at 700° to 850°C. In the reaction of step (a) the higher temperatures apply to the shorter times and the lower temperatures apply to longer reaction periods. Double oriented material has been coated with glass in accordance with this process with greatly reduced magnetostriction and good core loss values being realized.

Figure 3:
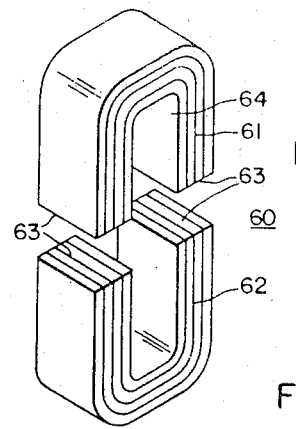
FIG. 3 is an exploded perspective view of a bonded wound and cut core comprising two U-shaped core segments.

The above description has been primarily directed to the preparation of glass coated electrical sheets for use as laminations in stacked cores. The principles of this invention have also been successfully applied to the manufacture of wound and cut cores of the type shown in FIG. 3 in which the glass coated electrical steel sheet of this invention has been employed in winding a core with a square window. The wound core has subsequently been subjected to a heat treatment to the softening temperature of the glass which fuses the glass coating between contacting layers to form an integral bonded core structure while at the same time the electrical sheet is stress relieved to reduce or remove the stresses set up in the core winding operation. The glass, in essence, provides a matrix for the core structure. In making the wound and cut cores, a glass having a firing temperature at the upper end of the specified range is required since it is in that range that the stress-relief anneal of the electrical sheet can be accomplished, and, of course, it is highly desirable to obtain bonding of the core and stress relief of the sheet concurrently. In FIG. 3 of the drawings, the core 60 has been cut into the two C-core halves, 61 and 62, with substantially plane faces 63. Whereby, when the core halves are reassembled, forming the window 64, there is no appreciable air-gap loss between the faces.

The general process for making glass-bonded wound and cut cores is as follows: the magnetic sheet material is provided with a thin fused coating of vitreous material, cooled, and then wound into a coil. The glass coated material is subsequently wound into a core configuration then loaded into a furnace and heated to the firing temperature with a weight or load on the core side to bring the laminations into contact to bond the core by the fused glass and to stress relieve the sheet.

Figure 4:
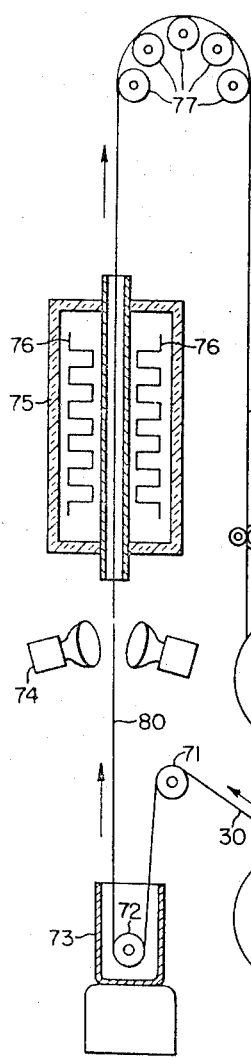
FIG. 4 is a schematic diagram of a line for applying a glass coating to the magnetic sheet.

One satisfactory apparatus for providing a thin fused coating of glass on the mill coated sheet is shown in FIG. 4. In the apparatus shown therein, the magnetic strip 80 is fed through the coating line by the take-off reel 70. The mill-coated magnetic strip 80 passes over the idler wheel 71 and into the binder trough or tank 73 around the idler wheel 72, which is submerged in the slip (a suspension of vitreous particles in a suitable vehicle such as amyl acetate or isopropyl alcohol) in the binder tank. In the binder tank the magnetic strip is provided with a thin coating of slip. The thickness of the coating which the magnetic strip acquires will depend on the speed of the magnetic strip through the binder tank and upon the consistency of the slip. Excess slip drains back into the binder tank as the strip emerges vertically from the slip.

The magnetic strip 80 passes upwardly between a set of infrared drying lamps 74 which dry the slip coating to a powdery slightly adherent layer. The coated magnetic strip then passes through the tube furnace 75 with its heating elements 76 in which the powdry coating is fused to a thin continuous layer. It should be noted that the apparatus is so constructed that the strip surfaces do not contact any part of the apparatus while the coating is in a powdry, easily removable condition. The vitreous coating solidifies quickly on emerging from the tube furnace and the strip passes over a series of idler rollers 77 which direct the magnetic strip in a downwardly path through the drive rollers 91 onto the take-up reel 92. The drive rollers 91 and the take-up reel 92 are driven by the power trains 95 and 96, respectively, from the drive unit 93.

While a dipping technique has been described for applying the slip to the magnetic strip, it will be apparent that the slip may be applied by roller or by spraying. It will also be understood that the slip may be a suspension of vitreous particles in water rather than alcohol as described above.

In deciding upon the glass composition to be employed in making wound and cut cores, the nature of glass must be considered. As is well known, in a glass the viscosity continuously decreases as the temperature is increased since glass does not have a precise melting point. The viscosity-temperature relationship of a particular glass will depend upon its composition. At about room temperature the glasses useful in making the magnetic cores of this invention are quite rigid with viscosities of $10^{17}$ poises and higher. In order to obtain the desired thin continuous fused glass insulating coating on the surfaces of the laminations in the coating process, the glass particles must be heated to a fluid condition represented by a viscosity of about 5,000 poises. After the core is wound, the annealing of the magnetic strip and the simultaneous bonding of the laminations is carried out in the softening temperature region of the glass for example, at a temperature of about 825°C, in which region the glass is in a plastic condition, having a viscosity of about $10^7$ poises. At this viscosity the glass coating of the individual laminations fuse and bond together when in intimate contact produced by the contact in existence between the wound laminations or even by pressing the laminations together. The glass bonded cores have a maximum operating temperature as high as the temperature of the deformation point of the glass (approximately $10^{11}$ to $10^{12}$ poises). At the softening temperature or deformation point, the glassbonded core will begin to lose its structural integrity and delamination can occur.

Glasses which have been found to be particularly suitable for the wound and cut cores are glasses which contain as a major component oxides of silicon, and are known as silicate glasses. The composition of these silicate glasses may be varied widely and innumerable variations of compositions may be made and employed.

The following silicate glasses have been employed in making bonded core structures:

TABLE IX

|  | Nominal Weight % | |
|---|---|---|
|  | M307 | M308 |
| $SiO_2$ | 50 | 49 |
| $Al_2O_3$ | 6 | 6 |
| $B_2O_3$ | 12 | 11 |
| $Na_2O$ | 11 | 14 |
| CaO | 6 | 7 |
| BaO | 15 | 11 |
| $P_2O_5$ | — | 2 |

Glass Coatings For Bonded Structures

Epstein strips (12 inches long, 1-3/16 inches wide cut from an unflattened coil of 11 mil thick high grade single oriented steel were coated with glasses M305, M307 and M308 from alcohol slurries. This steel is a high grade of single oriented steel having about 0.5 watts/lb. loss at 15 kilogauss at 60 cps. The steel was coated with the glass over a scrubbed mill coating. The strips were bonded three at a time by annealing for 3 hours both at 715° and 815°C in a 90% $N_2$, 10% $H_2$ atmosphere. It appears that some flattening of the strip occurred, especially at the higher annealing temperature. Samples without the glass coating were annealed at the same time. The following magnetic results were obtained on samples bonded three at a time:

TABLE X

| Glass | Annealing Temperature (°C) | Hc Oersteds | B10 (Gausses) | Pc15/60 (W/No.) | Pc17/60 (W/No.) |
|---|---|---|---|---|---|
| None | 715 | .110 | 18800 | .54 | .75 |
| M305 | 715 | .092 | 18800 | .51 | .72 |
| M307 | 715 | .093 | 18700 | .51 | .73 |
| M308 | 715 | .089 | 18900 | .51 | .71 |
| None | 815 | .098 | 18900 | .50 | .72 |
| M305 | 815 | .096 | 18600 | .54 | .76 |
| M307 | 815 | .101 | 18600 | .56 | .80 |
| M308 | 815 | .101 | 18500 | .55 | .81 |

The samples without glass had better properties after annealing at 815°C than 715°C because the 715°C anneal did not completely remove coil set. The 815°C results represent about the best Epstein values that can be obtained for this material. The glass coated and bonded strips annealed at 715°C all have essentially Epstein properties (most likely because of tensile stresses imparted by the glass coatings). The glass coated and bonded samples had slightly higher losses after the 815°C treatment. Good bonding was obtained for all glasses at both temperatures, though adherence was somewhat better at the higher temperature.

A quantity of unflattened 11 mil thick mill coated, the same high grade singly oriented steel, 1-¼ inchs wide was continuously coated with glass M307 from an alcohol slurry, and the coating was fired by running the strip through an open furnace at about 875°C. C-cores weighing approximately 1 lb. were wound from this coated strip. These cores were annealed at various temperatures in a 90% $N_2$, 10% $H_2$ atmosphere. After annealing, the cores were cut with conventional equipment. Cores made with uncoated strip were also annealed. The following properties were obtained on annealed and cut cores:

TABLE XI

| Glass | Annealing Temp. | Hc (Oersted) | B10 (Gauss) | Pc15/60 (W/No.) |
|---|---|---|---|---|
| M307 | 715 | .062 | 18400 | .52 |
| M307 | 760 | .053 | 18400 | .51 |
| M307 | 800 | .053 | 18300 | .51 |
| M307 | 815 | .053 | 18200 | .52 |
| None* | 825 | — | — | .57 |

*Organically bonded.

These results show that low losses were obtained on glass bonded and cut C-cores at the annealing temperatures employed. The losses on an organically bonded and cut core were considerably, about 10% higher.

The bonding technique can also be employed in making stacked cores of flat laminations. Four or five or more glass-coated laminations are stacked and placed in a furnace to fuse the glass and thus bond the laminations together as a core sub-unit. The tedious assembly of the cores, lamination by lamination, can thus be somewhat minimized in that the bonded core sub-unit groups of laminations can be assembled into a complete core with less effort and with less likelihood of damage to the lamination during the assembly operation.

There has thus been disclosed a relatively simple method for reducing the magnetostriction and strain sensitivity of oriented electrical steels, which produces a novel composite electrical steel sheet. Novel glass compositions particularly adopted to accomplish the desired results have also been presented. It will be appreciated that the invention may be practiced in ways other than those described herein for the purposes of exemplification and applicants do not wish to be limited by the details expressed herein.

We claim as our invention:

1. The combination of an insulating glass coating overlaying electrical steel having an adherent intermediate layer of a "mill coating" comprising the reaction product of the components of the surface of the steel and an oxygen containing inorganic compound which "mill coating" is formed during a prior heat treatment, said glass having a coefficient of thermal expansion of less than $8.5 \times 10^{-6}$ for improving magnetostriction and strain sensitivity, said glass consisting essentially of:

| Constituent | Weight Percent |
|---|---|
| SiO | 45–55 |
| $Al_2O_3$ | 5–7 |
| $B_2O_3$ | 10–14 |
| $Na_2O$ | 8–15 |
| CaO | 5–8 |
| BaO | 10–16 |
| $P_2O_5$ | up to 4 |
| $MoO_3$ | up to 2 | the glass being characterized by a firing temperature of between 700°C and 925°C.

2. The combination of claim 1 wherein composition is about 50% by weight of $SiO_2$, about 6% by weight of $Al_2O_3$, about 12% by weight of $B_2O_3$, about 11% by weight of $Na_2O$, about 6% by weight of CaO, and about 15% by weight of BaO.

* * * * *